US 12,477,534 B2

(12) United States Patent
Low et al.

(10) Patent No.: US 12,477,534 B2
(45) Date of Patent: Nov. 18, 2025

(54) UPLINK MEDIUM ACCESS CONTROL TOKEN SCHEDULING FOR MULTIPLE-CARRIER PACKET DATA TRANSMISSION

(71) Applicant: GREATER SHINE LIMITED, New Taipei (TW)

(72) Inventors: Su-Lin Low, San Diego, CA (US); Tianan Ma, San Diego, CA (US); Chun-I Lee, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 350 days.

(21) Appl. No.: 18/076,141

(22) Filed: Dec. 6, 2022

(65) Prior Publication Data

US 2023/0101531 A1  Mar. 30, 2023

Related U.S. Application Data

(63) Continuation of application No. PCT/US2021/029222, filed on Apr. 26, 2021.

(Continued)

(51) Int. Cl.
*H04W 72/1268* (2023.01)
*H04W 72/563* (2023.01)
*H04W 80/02* (2009.01)

(52) U.S. Cl.
CPC ..... *H04W 72/1268* (2013.01); *H04W 72/563* (2023.01); *H04W 80/02* (2013.01)

(58) Field of Classification Search
None
See application file for complete search history.

(56) References Cited

U.S. PATENT DOCUMENTS

2004/0264486 A1  12/2004 Sankey et al.
2010/0281486 A1*  11/2010 Lu .................. H04W 72/566
                                                  718/104

(Continued)

FOREIGN PATENT DOCUMENTS

EP        2343946 A2 *  7/2011  ............. H04L 5/001
EP        3509362 A1    7/2019
WO     2016020013 A1    2/2016

OTHER PUBLICATIONS

International Search Report issued in International application No. PCT/US2021/029222, mailed Aug. 9, 2021.

(Continued)

*Primary Examiner* — Anh Vu H Ly
(74) *Attorney, Agent, or Firm* — BAYES PLLC

(57) ABSTRACT

An apparatus for data packet processing can include a plurality of microcontrollers configured to perform dedicated layer-two circuit control functions. The plurality of microcontrollers can be configured to concurrently retrieve data from a set of common logical channels. The dedicated layer-two circuit control functions can include logical channel prioritization. The apparatus can also include a data processing layer-two circuit configured to perform data processing on the set of common logical channels based on commands received from the plurality of microcontrollers. The plurality of microcontrollers can be configured to receive uplink grants from a plurality of component carriers, to perform scheduling of the data based on the uplink grants, and to instruct the data processing layer-two circuit to retrieve the data responsive to the uplink grants.

19 Claims, 10 Drawing Sheets

Related U.S. Application Data

(60) Provisional application No. 63/036,568, filed on Jun. 9, 2020.

(56) References Cited

U.S. PATENT DOCUMENTS

| | | | | |
|---|---|---|---|---|
| 2010/0306483 | A1* | 12/2010 | Buick | G06F 9/546 |
| | | | | 711/E12.002 |
| 2011/0170495 | A1 | 7/2011 | Earnshaw et al. | |
| 2011/0310986 | A1* | 12/2011 | Heo | H04L 5/0055 |
| | | | | 375/259 |
| 2012/0057547 | A1 | 3/2012 | Lohr et al. | |
| 2014/0133410 | A1 | 5/2014 | Nguyen et al. | |
| 2018/0279358 | A1* | 9/2018 | Babaei | H04W 72/0453 |
| 2022/0224447 | A1* | 7/2022 | Seidel | H04L 1/1896 |
| 2023/0006935 | A1* | 1/2023 | Low | H04L 47/6215 |

OTHER PUBLICATIONS

Written Opinion of the International Searching Authority issued in International application No. PCT/US2021/029222, mailed Aug. 9, 2021.

Extended European Search Report issued in corresponding European application No. 21820981.5, mailed Sep. 7, 2023.

Huawei, HiSilicon, "Enhancement of LCP procedure for UL split bearer", R2-141154; 3GPP TSG-RAN WG2 Meeting #85bis Valencia, Spain, Mar. 31-Apr. 4, 2014.

* cited by examiner

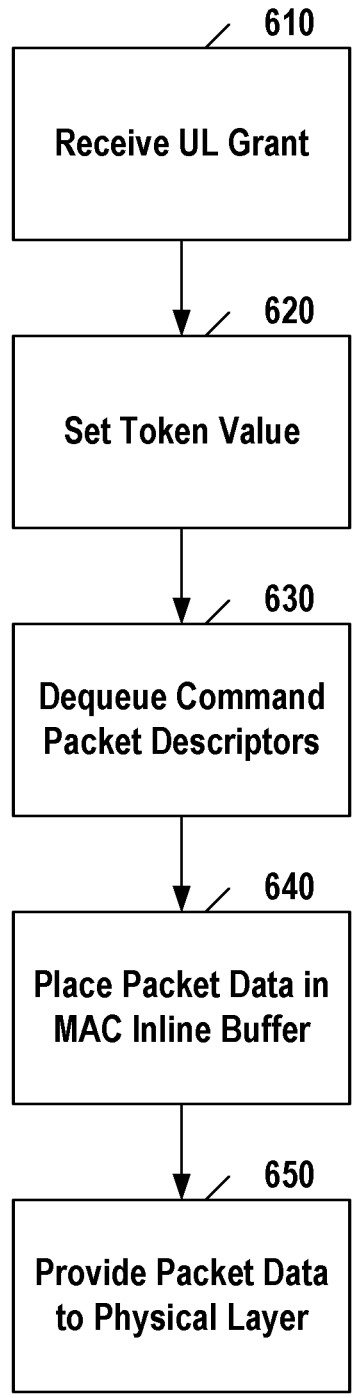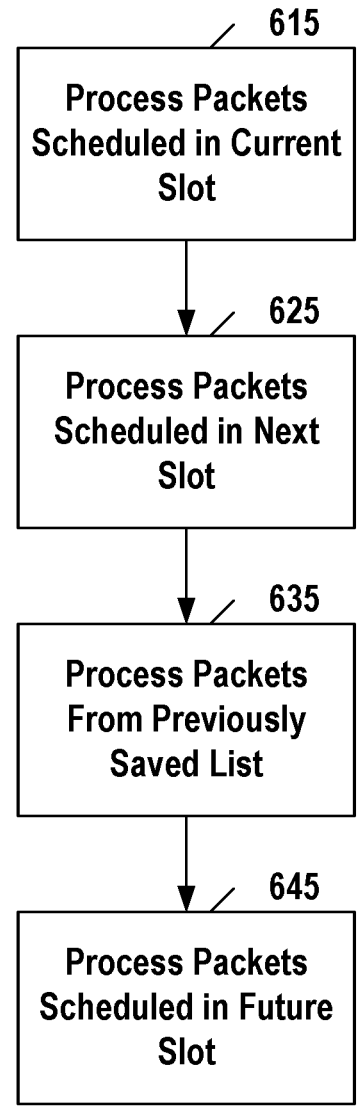
FIG. 6A
FIG. 6B

UPLINK MEDIUM ACCESS CONTROL TOKEN SCHEDULING FOR MULTIPLE-CARRIER PACKET DATA TRANSMISSION

CROSS-REFERENCE TO RELATED APPLICATIONS

This application is a continuation of International application No. PCT/US2021/029222, filed Apr. 26, 2021, which claims the benefit of priority to U.S. Provisional Patent Application No. 63/036,568, filed Jun. 9, 2020, entitled "5G UE UPLINK MAC TOKEN SCHEDULING SCHEME FOR MULTIPLE CARRIERS PACKET DATA TRANSMISSION," both of which are hereby incorporated by reference in their entireties.

BACKGROUND

Embodiments of the present disclosure relate to apparatuses and methods for wireless communication.

Wireless communication systems are widely deployed to provide various telecommunication services such as telephony, video, data, messaging, and broadcasts. In wireless communications, there may be uplink communications from a user equipment to a base station and downlink communications from the base station to the user equipment. The base station may control uplink communications from the user equipment to the base station by providing an uplink grant to the user equipment to permit the user equipment to communicate in uplink at a scheduled time. The user equipment may then prepare data packets for transmission at the scheduled time.

SUMMARY

Embodiments of apparatus and method for data packet processing are disclosed herein.

In one example, an apparatus for data packet processing can include a plurality of microcontrollers configured to perform dedicated layer-two circuit control functions. The plurality of microcontrollers can be configured to concurrently retrieve data from a set of common logical channels. The dedicated layer-two circuit control functions can include logical channel prioritization. The apparatus can also include a data processing layer-two circuit configured to perform data processing on the set of common logical channels based on commands received from the plurality of microcontrollers. The plurality of microcontrollers can be configured to receive uplink grants from a plurality of component carriers, to perform scheduling of the data based on the uplink grants, and to instruct the data processing layer-two circuit to retrieve the data responsive to the uplink grants.

In some embodiments, the plurality of microcontrollers can be configured to control the data processing layer-two circuit based on a token value. The token value can be configured to ensure proportionality among the component carriers.

In another example, a method for data packet processing can include receiving uplink grants from a plurality of component carriers. The method can also include scheduling, by a plurality of microcontrollers, data based on the uplink grants. The method can further include concurrently retrieving, by the plurality of microcontrollers, the data from a set of common logical channels. The microcontrollers can be configured to perform logical channel prioritization for the data. The concurrently retrieving can include instructing data processing layer-two circuit to retrieve the data responsive to the uplink grants. The data processing layer-two circuit can be configured to perform data processing on the set of common logical channels based on commands received from the plurality of microcontrollers.

In a further example, a method for data packet processing can include receiving uplink grants from a plurality of component carriers. The method can also include prioritizing amongst a plurality of transmission data command queues based on a dynamic transmission component carrier priority list. The plurality of transmission data command queues can be equal in number to the plurality of component carriers. The method can further include retrieving data from a set of common logical channels responsive to the uplink grants. The retrieving can be based on a token value. The token value can be configured to ensure proportionality among the component carriers. The retrieving can be performed using a plurality of transmission data command queues.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 6A illustrates a method for data packet processing, according to some embodiments of the present disclosure.

FIG. 6B illustrates a further method for data packet processing, according to some embodiments of the present disclosure.

Figure 1:
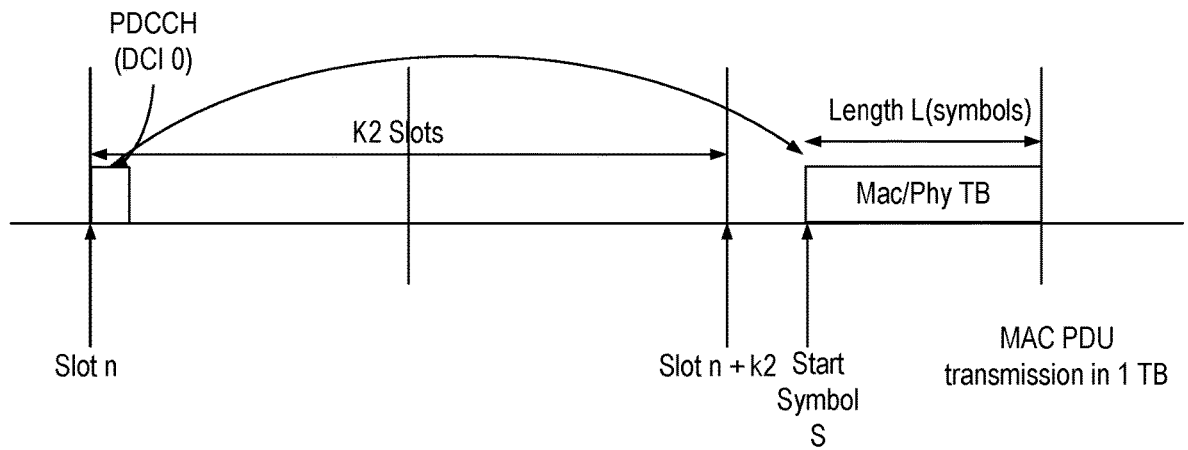
FIG. 1 illustrates medium access control protocol data unit (PDU) scheduled uplink in two cases.
Figure 1:
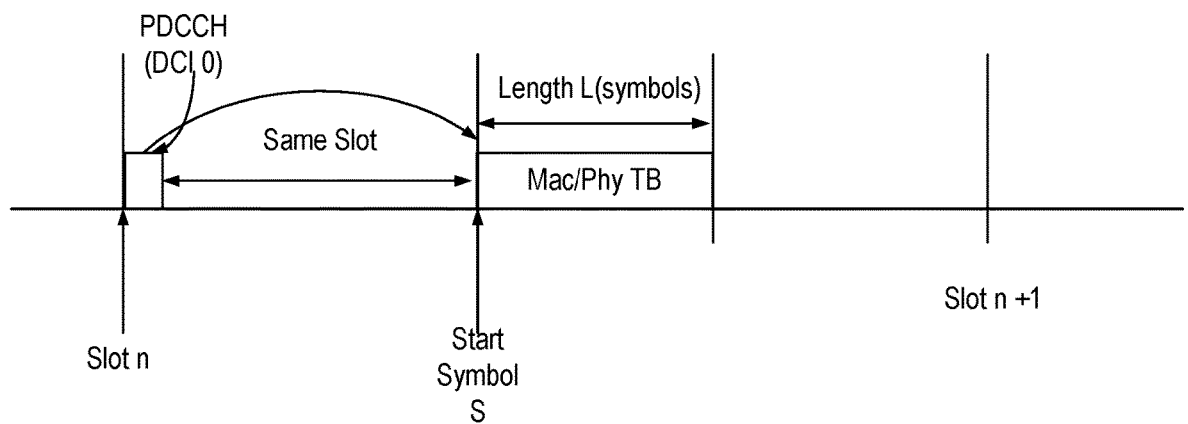

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), CDMA 2000, etc. A TDMA network may implement a RAT, such as Global System for Mobile communication (GSM). An OFDMA network may implement a RAT, such as Long-Term Evolution (LTE) or New Radio (NR). The techniques described herein may be used for the wireless networks and RATs mentioned above, as well as other wireless networks and RATs.

In typical cellular modems, the data plane architecture of the modem may be statically configured for the maximum expected throughput processing, including processors that are not scalable. In some cellular modems, processing units that are specific to one or two layers may be implemented. As such, the processing units may not be proportionally scalable to optimize the power and performance of the modem, to support either high throughput or low latency low throughput applications.

In a fifth-generation (5G) cellular wireless modem, the user equipment (UE) uplink (UL) medium access control (MAC) layer can receive the UL grant resource allocation from the physical downlink control channel (PDCCH) in a downlink control indicator (DCI) at the beginning of a slot. The UL grant resource allocation can inform the UE to transmit an UL MAC protocol data unit (MACPDU) at a time delay equivalent to K2 slots away from the current slot.

In a fifth-generation (5G) cellular wireless modem, the UE modem data stack layers can include the medium access control (MAC) layer, radio link control (RLC) layer, packet data convergence protocol (PDCP) layer, service data adaptation protocol (SDAP) layer, and layer 3 (L3)/layer 4 (L4) layers. In the uplink (UL) direction, data packets can be scheduled for transmission when the user equipment (UE) modem receives a DCI 0 information message from the physical downlink control channel (PDCCH) from the base station/network in the downlink. This DCI 0 grant message can include information from which the UE can derive the grant size given by the network (NW), among other parameters, for a specific component carrier (CC).

FIG. 1 illustrates MAC protocol data unit (PDU) scheduled uplink in two cases. In a first case, illustrated in the top portion of FIG. 1, the transmission is scheduled one or more slots away. In the second case, illustrated in the bottom portion of FIG. 1, the transmission is scheduled in the same slot as the grant. As illustrated in FIG. 1, the DCI 0 in the PDCCH can schedule for an UL data transmission that is in various timeline delays away from the receipt of the DCI 0 message, indicated by a K2 value.

For example, K2 may be less than one slot. This may indicate that the UL data transmission is scheduled for the current same slot. Such a short K2 may be used for low latency fast small packet applications. As mentioned above, this case is illustrated in the bottom portion of FIG. 1.

In another example, K2 may be equal to 1. This indicates an UL data transmission scheduled for the next slot, and could be for medium latency and high throughput packets. Finally, K2 may be greater than 1. This indicates that the UL data transmission is scheduled for several K2 slots away from the current slot, and is typically used for high throughput delay tolerant applications. These two cases, K2=1 and K2>1, are illustrated in the top portion of FIG. 1.

With multiple carriers, the UL MAC layer may need to concurrently schedule data transmission for these carriers by constructing the MAC PDUs for each slot, for each carrier.

The UL MAC layer can use logical channel prioritization (LCP) as specified in Third-Generation Partnership Project (3GPP) standards to gather packets from a common set of logical channels (LCs) and data radio bearers (DRBs). This LCP task can be performed for each CC when the slot grant indication from the physical (PHY) layer is received, namely whenever the DCI message is decoded from the PDCCH.

The LCP task can go through the common LC and DRB queues, and dequeue packet after packet until the grant for that LC is used up, or the entire transport block (TB) grant is consumed.

In a typical UE modem data stack, the LC and DRB data packets are processed through the PDCP and RLC layers, and stored in an external memory waiting for UL data transmission by the MAC layer for each CC.

Data from multiple logical channels and radio bearers can be processed and stored in external memory, and then retrieved from external memory for PHY layer transmission. In the case of multiple carriers, these data can be retrieved in parallel if there are multiple instances of data plane and transmission physical layer hardware (TX PHY HW), or in a round-robin fashion with a pre-defined number of data packets if there is only one data plane and TX PHY HW.

Some of these approaches may provide for inefficient local memory resource usage in UE, requiring large internal memory. Similarly, these approaches may require numerous external DDR memory accesses. Furthermore, there may be large power usage at the UE and a large die size for the UE modem chip. Additionally, there may be wastage due to multiple instances of HW resources. Moreover, there may be a high chance of delay in transmission due to data processing timeline not being met.

A challenge in the 5G UL data path is to be able to transmit packet data from Layer 3 to Layer 2 and on to PHY layer efficiently without large storage of intermediate buffers or data movements to external memory. In the event of multiple carriers, given one set of HW resources, the UE has to optimally manage and multiplex the retrieval of L3 data, process through DP layers, and send them to PHY layer, for all the carriers concurrently.

Some embodiments of the present disclosure provide a 5G UE uplink MAC token scheduling scheme for multiple-carrier packet data transmission. More particularly, some embodiments provide a method for 5G UE UL MAC layer to efficiently schedule multiple carriers UL transmission to the PHY layer. Some embodiments use minimal local memory and external memory data movements to multiplex the scheduling and transmission of data packets from L3 to L2 and PHY layers, using one set of data plane hardware (DPHW).

Some embodiments relate to scheduling multiple UL carriers with distributed LCP microprocessors. This can be referred to as UL multiple-carrier scheduling with distributed LCP microcontrollers (uCs). The UE UL MAC LCP algorithm task, one for each carrier CC, can be distributed on multiple small microcontrollers (uCs) to concurrently retrieve data from a set of common logical channels and program the DPHW efficiently.

Some embodiments relate to providing a token value X for each carrier's transmit command queue. For each CC, a TX command queue (TxData CmdQ) can be defined for controlling the DPHW. A token value X for each TxData CmdQ can be specified for the DPHW to retrieve a proportional amount of data bytes per CC to the PHY layer.

Some embodiments relate to providing for DPHW priority reading across carriers with a dynamic CC priority list. In addition to the token X, some embodiments also define a CC priority list, which can instruct the DPHW to read the multiple CC's TxData CmdQ in a dynamic sequence.

Each of the above principles that may appear individually or in combination with one another in some embodiments. In the following descriptions, more details of these principles are explained with reference to diagrams, which should be considered as illustrative of the principles and not as limiting.

Figure 2:
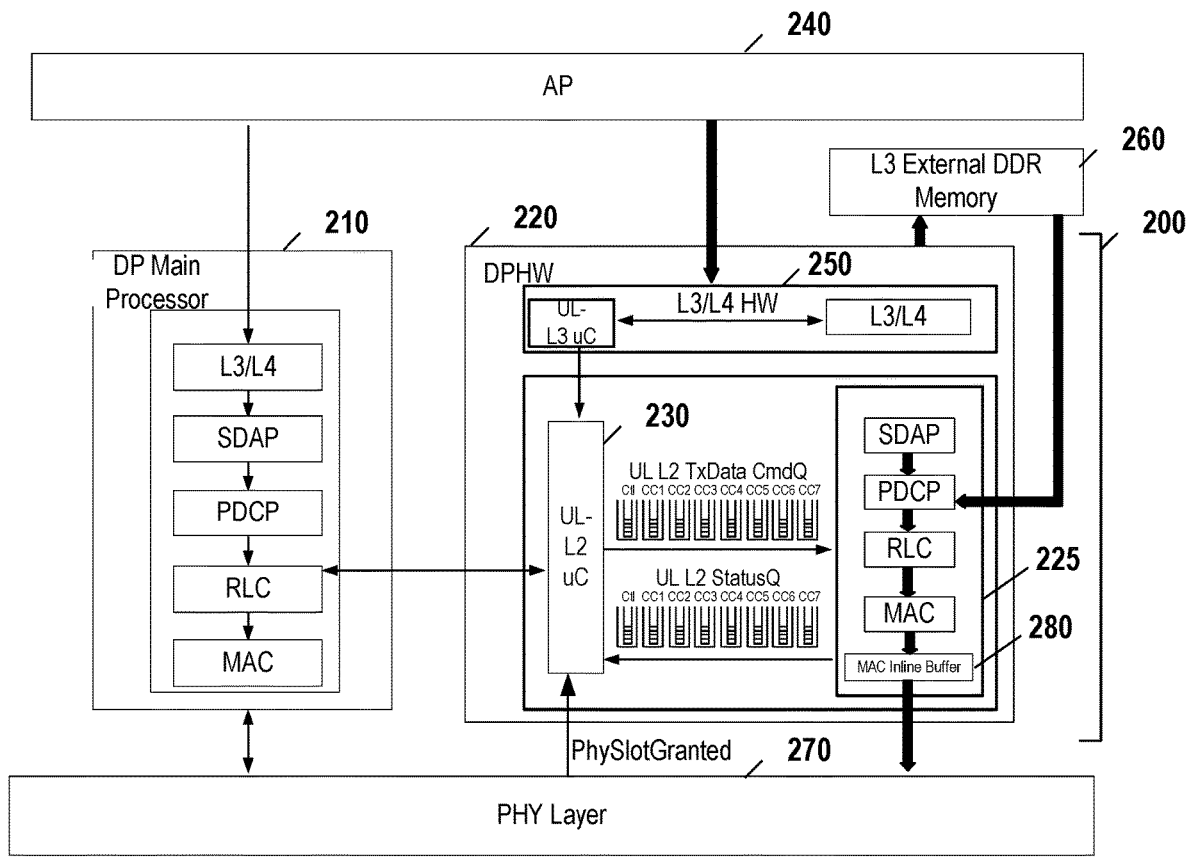
FIG. 2 illustrates an uplink medium access control token scheduling scheme for multiple-carrier packet data transmission, according to some embodiments.

FIG. 2 illustrates an uplink medium access control token scheduling scheme for multiple-carrier packet data transmission, according to some embodiments. More particularly, as mentioned above, some embodiments relate to UL MAC multiple-carrier scheduling with distributed logical channel prioritization microcontrollers.

A user equipment layer 2 data processing (DP) subsystem 200 can include a DP main processor 210 where complex asynchronous DP functions reside, a DP L2 HW 220 where data processing operations circuits 225 for MAC, RLC, PDCP HW data processing operations reside, and a set of L2 microcontrollers (uCs) 230 where dedicated L2 HW control operations reside. The data processing operations circuits 225 can be a set of circuits dedicated to performing sub-layer functions of L2.

As shown in FIG. 2, one or more UL L2 uCs 230 can communicate with the data processing operations circuits 225 via a set of transmission data command queues (TxData CmdQs) and Status queues (UL L2 StatusQ). These transmission data command queues can be set up such that there is one command queue and one status queue per component carrier. Incoming L3 packet data from AP 240 can be processed by L3/L4 DPHW 250, and then stored in external memory 260, which may be a double data rate (DDR) memory. Upon PHY layer 270 indication to transmit UL data, UL L2 uCs 230 can program the data processing operations circuits 225 using the command queues, to retrieve data from L3 external memory 260, and can perform packet processing through the PDCP, RLC, and MAC layers both in DP main processor 210 and data processing operations circuits 225, before sending the data bytes to the TX PHY layer 270.

Figure 3:
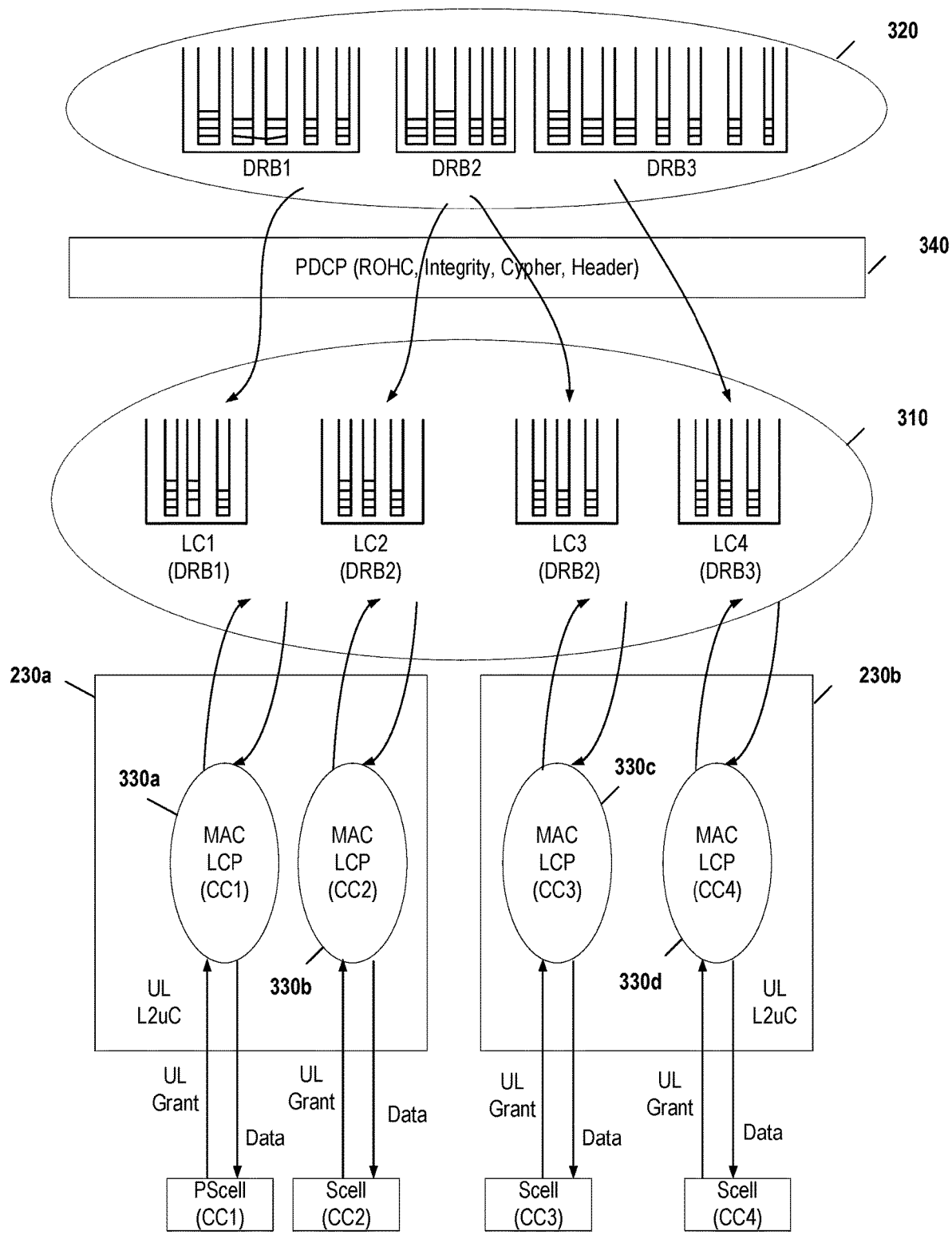
FIG. 3 illustrates a user equipment uplink medium access control token scheduling scheme for multiple-carrier packet data transmission, according to some embodiments of the present disclosure.

FIG. 3 illustrates a user equipment uplink medium access control token scheduling scheme for multiple-carrier packet data transmission, according to some embodiments of the present disclosure. More particularly, FIG. 3 illustrates a 5G UE UL MAC token scheduling scheme that includes multiple LCP functions.

As shown FIG. 3, in the UL MAC, multiple logical channel prioritization functions may reside in one or more UL L2 uCs 230a, 230b. Each LCP task can correspond to 1 CC's grant servicing function. Upon PHY layer's PhySlotGrantInd (shown in FIG. 2), which specifies the per-slot grant size for an incoming CC's UL grant. The corresponding LCP function can run a priority scheme to dequeue packets from a set of common logical channels 310 and associated data radio bearers 320. For new packets, each packet descriptor can contain one or more pointers to the actual user data buffers in external memory 260, shown in FIG. 2.

Each LCP function 330a, 330b, 330c, 330d can then construct a command packet descriptor for each packet dequeued for transmission, and can enqueue this command packet descriptor to the transmission data command queue for DP L2HW processing. As shown in FIG. 2, DP L2 HW 220 including data processing operations circuits 225 can process the CmdQ packet descriptor one at a time for data transmission.

At this point, data processing operations circuits 225 can retrieve the new L3 data packets from a radio bearer from the external memory 260, traverse through the L2 layer data stack of PDCP (through robust header compression (ROHC), ciphering, integrity check, and other header processing) shown as 340 in FIG. 3, as well as though RLC and MAC, and can encode the packet data headers, and stream the bytes into a MAC inline buffer 280 for quick temporary buffering, before being pulled into the TX PHY layer 270, upon a Phy DataReq signal (not shown) from TX PHY layer 270.

Figure 4:
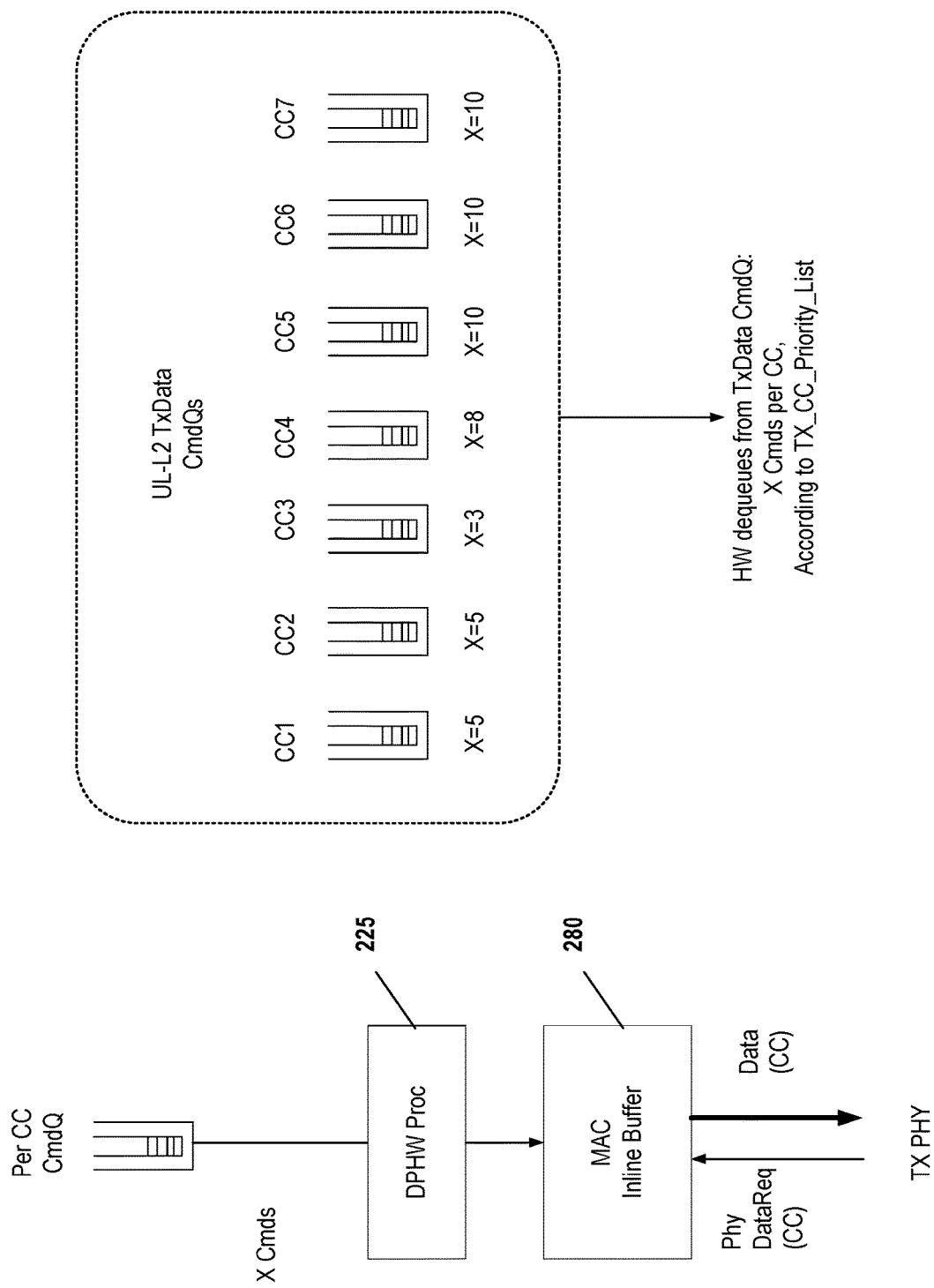
FIG. 4 illustrates an uplink medium access control token scheduling scheme, according to some embodiments of the present disclosure.
Figure 5:
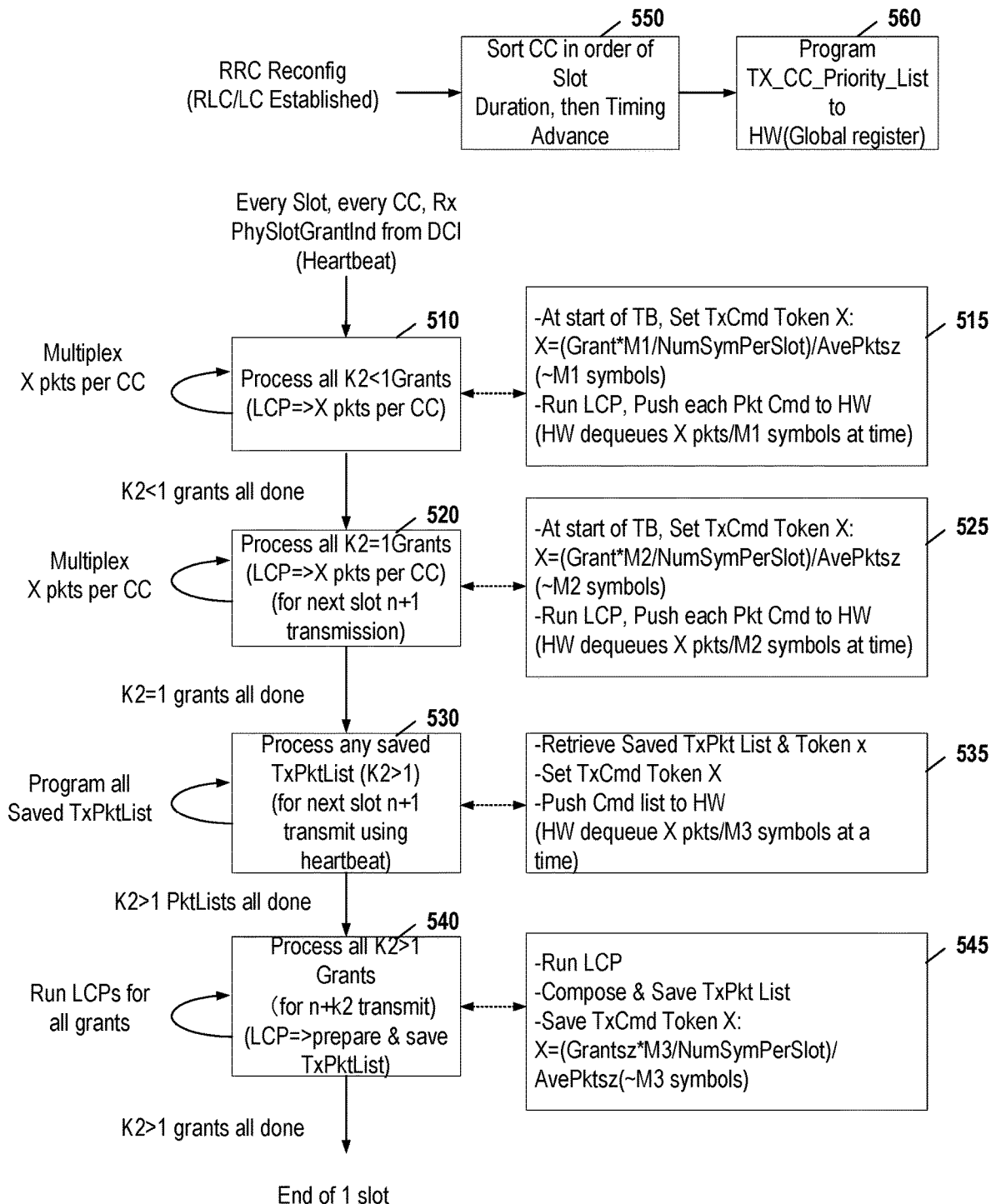
FIG. 5 illustrates an uplink medium access control scheduler flow mechanism, according to some embodiments.

FIG. 4 illustrates an uplink medium access control token scheduling scheme, according to some embodiments of the present disclosure. FIG. 5 illustrates an uplink medium access control scheduler flow mechanism, according to some embodiments.

As shown in FIG. 4, a token value, X, can be set at the beginning of each slot. More particularly, for each CC's transmission data command queue, at the beginning of each slot, a token value, X, can be set. The token value can be set at the start of each transport block (TB), whenever a given LCP module processes an incoming grant from a CC. This grant, which can be signaled as PhySlotGrantInd as shown in FIG. 2, can carry the grant size for this CC for a slot. The transmission corresponding to the grant size can be scheduled for the same slot (K2<1), next slot (K2=1), or a future slot (K2>1).

The token value, X, can be defined as the quota for data processing operations circuits 225 for dequeuing command packet descriptors from the TxData CmdQ, at each service time per slot, per CC. This token X can instruct the DPHW to pull in enough data packet bytes to dynamically fill MAC inline buffer 280, such that these bytes can be pulled out to the TX PHY layer upon transmission data requests. Data processing operations circuits 225 can multiplex the TxData CmdQ for each CC, such that only X commands (corresponding to X packets) are processed each time from each TxData CmdQ. Thus, only the corresponding X packets' data bytes may be pulled in from each CC into the MAC inline buffer 280, ready for TX PHY transmission.

The amount of data bytes specified by token X can correspond proportionally to the bandwidth of each CC per slot, which can be on the order of some number of symbols at a time. This can be specified as follows: X=(Grantsz*M/NumSymPerSlot)/AvePktSz, where M can be the number of symbols to be pulled into TX PHY at a time, per CC, Grantsz can be the size of the grant per slot, per CC, NumSymPerSlot can be the number of symbols per slot, per CC, and AvePktSz can be the running average of the packet size being served, per CC.

As shown in FIG. 5, there can be a 5G UE uplink MAC token scheduling approach for multiple-carrier packet data transmission. The following sequence of events can be performed upon the processing of the PhySlotGrantInds for each slot for multiple CCs.

At 510, processing can occur for the same slot grants, namely grants where K2<1. In such circumstances, transmission is to occur in a same slot, n. In this case, LCP can be performed for X packets per component carrier. Specifically, upon the start of a slot, if there are same slot grants (K2<1) arriving, these should be served with the highest priority, X packets at a time when running each LCP, till all grants are serviced. The token X can be calculated as follows: X=(Grantsz*M1/NumSymPerSlot)/AvePktSz, where M1 can represent the number of symbols to be retrieved by DPHW to be ready in the MAC inline buffer. The token X can be written into HW register for this CC, or as a parameter in the packet descriptor command, at the start of each TB. Thus, at 515, the token X can be calculated and set, LCP can be run, and packet commands can be pushed to hardware. The hardware can dequeue packets, M1 symbols at a time.

At 520, processing can occur for the next slot grants, namely grants where K2=1. In such circumstances, transmission is to occur in the next slot, n+1. In this case, LCP can be performed for X packets per component carrier. If there are grants for the next slot (K2=1), these can be serviced with the next highest priority after the current slot grant until all grants are served, X packet cmds at a time per LCP, with Token X calculated as follows: X=(Grantsz*M2/NumSymPerSlot)/AvePktSz, where M2 represents the number of symbols to be retrieved by DPHW to be ready in the MAC inline buffer. The token X can be written into HW register for this CC, or as a parameter in the packet descriptor in the command queue. Thus, at 525, token X can be calculated and set, LCP can be run, and packet commands can be pushed to hardware, with hardware dequeuing X packets/M2 symbols at a time.

At 530, processing can occur for saved slot grants from a previous process, which may include grants where K2>1. In such circumstances, transmission may occur in the next slot, n+1, using a heartbeat. In this case, LCP does not need to be performed, as it may have been previously performed to form the saved transmission packet list. For example, if there is any saved TxPktList that was composed in an earlier slot, this list can be retrieved and programmed into the DPHW. The token X can be set at this point for the DPHW, to pull in data into the MAC inline buffer. Thus, at 535, the saved transmission packet list can be retrieved, together with a stored token x, token x can be set, and a command list can be pushed to hardware, so that the hardware can dequeue X packets/M3 symbols at a time, where M3 represents the number of symbols to be retrieved by DPHW to be ready in the MAC inline buffer.

At 540, processing can occur for future slot grants, namely grants where K2>1. In such circumstances, transmission is to occur in the next slot, n+1. In this case, LCP can be performed for X packets per component carrier. If there are grants for future slot n+K2 (K2>1), these can be serviced last in the slot, until all grants are served, X packet cmds at a time per LCP, with token X calculated as follows: X=(Grantsz*M3/NumSymPerSlot)/AvePktSz, where M3 represents the number of symbols to be retrieved by DPHW to be ready in the MAC inline buffer. However, instead of programming the DPHW directly, this packet descriptors list, TxPktList, and the token X can be saved to be used at 530 in a future slot. More particularly, the saved descriptor list can be processed later at slot n+k2−1, namely one slot before the scheduled transmission, driven by a heartbeat given from the PhySlotGrantInd. Thus, at 545, LCP can be run, and a transmission packet list can be composed and saved, together with a token X.

Additionally, some embodiments can implement DPHW priority reading across CCs with a dynamic TX_CC_Priority_List. For example, in addition to programming a token X value for the DPHW to retrieve a proportional amount of data byte into the MAC inline buffer per CC according to its grant bandwidth, a dynamic TX_CC_Priority_List is also programmed to the DPHW, which instructs the DPHW the order of priority reading of CmdQs among the several CCs.

Upon reception of a radio resource control (RRC) reconfiguration message, at 550, the dynamic priority list can be sorted in order according to the following criteria: slot duration (for example, a component carrier having a nearest slot can be prioritized over one with a more distant future slot) then timing advance (shorter timing advance for a component carrier may be favored over longer timing advance). In some examples, the smaller the slot duration, the higher the priority. This may be because the smaller slot may benefit from faster retrieval of data due to lower latency requirements. If several CCs have equivalent slot duration, then the CCs can be sorted in order of timing advance. The greater timing advance implies a greater difference between the Rx timing and the Tx timing. The dynamic priority list, TX_CC_Priority_List, can be programmed to hardware in a global register at 560.

Some embodiments allow UE UL MAC layer to efficiently schedule multiple carriers UL transmission to the PHY layer, with minimal local memory and external memory data movements. Moreover, some embodiments may enhance UE 5G high throughput performance and Ultra Reliable Low Latency Communication (URLLC) applications.

Some embodiments may provide various benefits and/or advantages. For example, some embodiments may provide optimal multiplexing and retrieval of data packets from L3 external memory to L2 and PHY layer. Moreover, some embodiments may provide proportional fairness of packet processing in all CCs, without starvation of any CC data bytes. Additionally, some embodiments may provide simple interface logic for DP HW control. Also, some embodiments may be implemented with efficient, small, local memory resource usage in the UE. Additionally, some embodiments may rely on a reduced number of external DDR memory accesses, while providing improved power usage at the UE. Some embodiments may be implemented with a small UE die size. Some embodiments may eliminate the wastage of multiple instances of HW resources. Additionally, some embodiments may eliminate delay in transmission due to data processing timeline not met.

Various changes, modifications, and variations on the above-described approaches may also be implemented. For example, a semi-static token value can be programmed according to the priority and slot duration of each CC. Additionally, some embodiments may use a fixed CC priority list instead of a dynamic configuration.

FIG. 6A illustrates a method for data packet processing, according to some embodiments of the present disclosure. The method of FIG. 6A may be implemented, for example, using the system shown in FIG. 2. The method of FIG. 6A can include, at 610, receiving an uplink grant corresponding to a component carrier. For example, as shown in FIG. 3, different uplink grants may correspond to different component carriers.

The method of FIG. 6A may also include, at 620, setting a token value at the beginning of a slot responsive to the uplink grant. The token value can be the token value X discussed above, which can be calculated in various ways depending on the situation, as explained above. The token value X can allow X packets per component carrier to be multiplexed. Setting the token value at the beginning of the slot, can refer to setting this token value before beginning to transmit data in the current slot, or setting this token value before performing the following steps. It is not necessary that the token value calculation to begin in perfect synchronization with the beginning of the slot.

For example, at 630, the method of FIG. 6A can include dequeuing command packet descriptors from a queue based on the token value. For example, if the token value is X, then X command packet descriptors can be dequeued in series.

The method can further include, at 640, placing packet data in a medium access control inline buffer based on the dequeued command packet descriptors. Furthermore, the method can include, at 650, providing the packet data from the medium access control inline buffer to a physical layer at a time corresponding to a transmission time indicated in the uplink grant.

FIG. 6B illustrates a further method for data packet processing, according to some embodiments of the present disclosure. The method of FIG. 6B may be implemented, for example, using the system shown in FIG. 2. The method of FIG. 6B can include, at 615, processing a first number of packets based on a first token value. The first number of packets can be those to be transmitted in a current slot. The processing of the first number of packets based on the first token value can include multiplexing a number of packets per component carrier corresponding to the first token value.

The method can also include, at 625, processing a second number of packets based on a second token value. The second number of packets can be those to be transmitted in a slot immediately following the current slot.

The method can further include, at 635, processing a third number of packets based on a third token value. The third number of packets can include packets from a saved transmission packet list from a slot prior to the current slot. The third token value can be retrieved as a stored value from a calculation performed in a slot before the current slot, as illustrated in FIG. 5.

As shown in FIG. 6B, the method can further include, at 645, processing a fourth number of packets. The fourth number of packets can include packets to be transmitted more than one slot after the current slot. The processing of the fourth number of packets can further include saving the fourth token value together with a transmission packet list of the packets to be transmitted more than one slot after the current slot. The saved transmission packet list and the fourth token value can be saved and used at 635 in a later slot. In that later slot, the new third token value can be this fourth token value.

Figure 7:
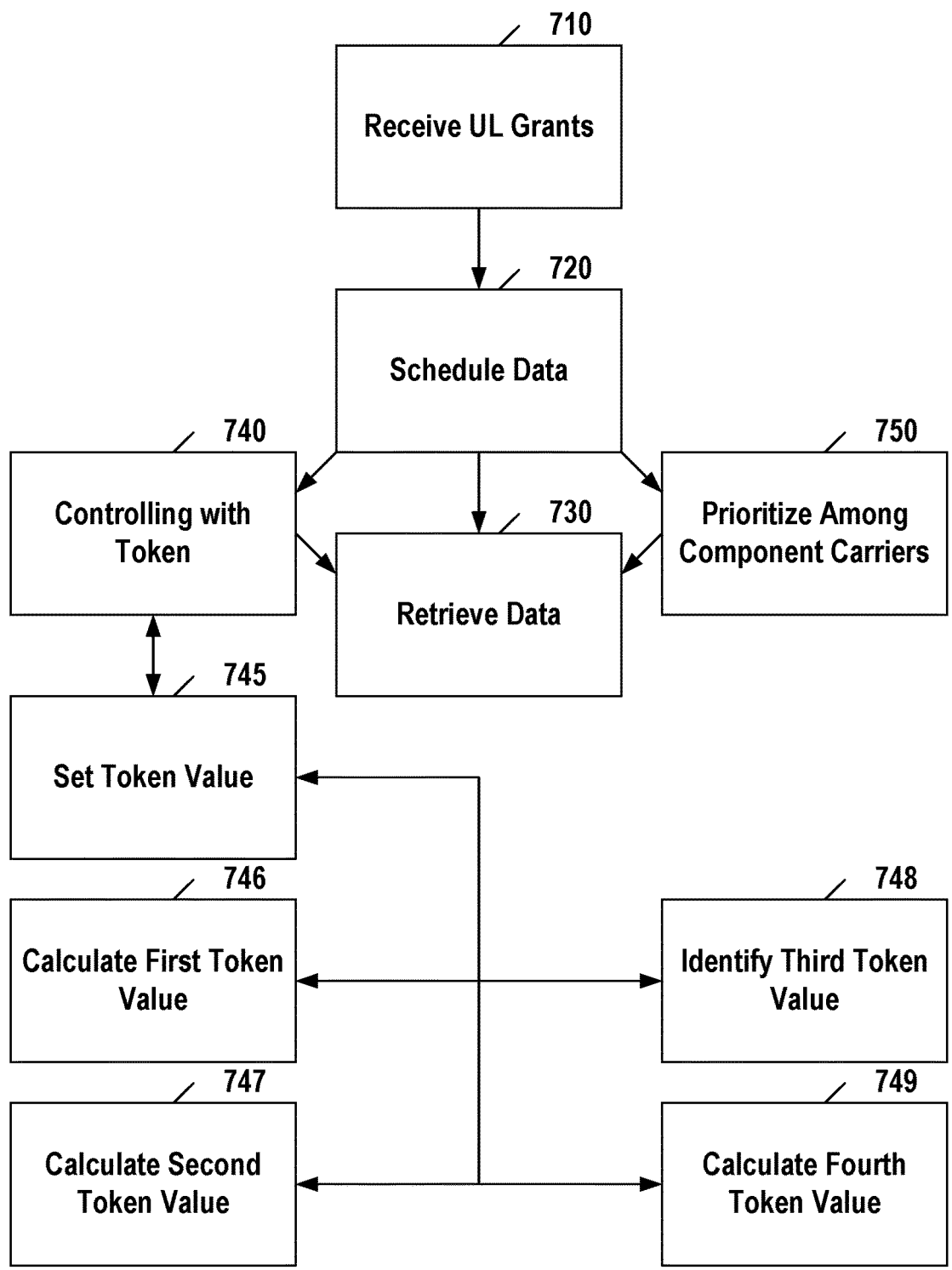
FIG. 7 illustrates a method for data packet processing, according to some embodiments of the present disclosure.

FIG. 7 illustrates a method for data packet processing, according to some embodiments of the present disclosure. The method of FIG. 7 may be implemented by, for example, the system of FIG. 2.

As shown in FIG. 7, a method can include, at 710, receiving uplink grants from a plurality of component carriers, as also illustrated by way of example in FIG. 3.

The method of FIG. 7 can also include, at 720, scheduling, by a plurality of microcontrollers, data based on the uplink grants. This scheduling can refer to the process conducted at, for example, a user equipment, as distinct from the scheduling that may occur at the base station. Thus, the base station may schedule the user equipment to transmit at a certain slot, and then the user equipment may schedule particular packets for transmission at that certain slot.

The method of FIG. 7 can also include, at 730, concurrently retrieving, by the plurality of microcontrollers, the data from a set of common logical channels. The microcontrollers can be configured to perform logical channel prioritization for the data, as illustrated in FIG. 3, for example.

The concurrently retrieving can include instructing a data processing layer-two circuit (for example, data processing operations circuits 225 in FIG. 2) to retrieve the data responsive to the uplink grants. The data processing layer-two circuit can be configured to perform data processing on the set of common logical channels based on commands received from the plurality of microcontrollers, for example, based on commands in UL L2 TxData CmdQ in FIG. 2.

The method of FIG. 7 can further include, at 740, controlling, by the plurality of microcontrollers, the data processing layer-two circuit based on a token value. The token value can be configured to ensure proportionality among the component carriers. More particularly, the method can also include, at 745, setting, by the data processing layer-two circuit, the token value for dequeuing command packet descriptors from a corresponding transmission command queue based on the token value. Examples of calculations are set forth above, although other methods of calculating or otherwise setting the token are also permitted.

The plurality of component carriers can have a corresponding plurality of transmission data command queues, for example, one transmission data command queue for each component carrier. The method can additionally include, at 750, prioritizing, by the data processing layer-two circuit, amongst the plurality of transmission data command queues based on at least one of a slot duration or a timing advance of corresponding component carriers. For example, as illustrated above, prioritization can be performed based on slot duration and then by timing advance.

The setting of the token value can involve various calculations, as mentioned above. For example, at 746, the method can include calculating, by the plurality of microcontrollers, the token value as a first token value for a first number of packets. The first number of packets can be packets that are to be transmitted in a current slot (referred to as slot n, above). The method can also include, at 747, calculating, by the plurality of microcontrollers, the token value as a second token value for a second number of packets. The second number of packets can be packets that are to be transmitted in a slot immediately following the current slot (referred to as slot n+1, above).

The method can further include, at 748, identifying, by the plurality of microcontrollers, the token value as a third token value for a third number of packets. The third number of packets can be packets from a saved transmission packet list from a slot prior to the current slot.

The method can additionally include, at 749, calculating, by the plurality of microcontrollers, the token value as a fourth token value for a fourth number of packets. The fourth number of packets can be packets to be transmitted more than one slot after the current slot.

The above features may be performed with the specific hardware mentioned above, or with other hardware. For example, a method for data packet processing can include, at 710, receiving uplink grants from a plurality of component carriers. The method can then include, at 750, prioritizing amongst a plurality of transmission data command queues based on a dynamic transmission component carrier priority list. The plurality of transmission data command queues can be equal in number to the plurality of component carriers. The method can further include, at 730, retrieving data from a set of common logical channels responsive to the uplink grants. The retrieving can be based on a token value. The token value can be configured to ensure proportionality among the component carriers. The retrieving can be performed using a plurality of transmission data command queues. The setting the token value can be performed at 745 for dequeuing command packet descriptors from a corresponding transmission command queue of the plurality of transmission data command queues based on the token value.

The methods of FIGS. 6A, 6B, and 7 may be variously implemented in hardware, such as using the system of FIG. 2. An apparatus for data packet processing can include a plurality of microcontrollers (for example, UL L2 uCs 230 in FIG. 2) configured to perform dedicated layer-two circuit control functions. The plurality of microcontrollers can be configured to concurrently retrieve data from a set of common logical channels (see the pool of logical channels 310 in FIG. 3). The dedicated layer-two circuit control functions can include logical channel prioritization also illustrated in FIG. 3.

The apparatus can also include a data processing layer-two circuit (see, for example, data processing operations circuits 225 in FIG. 2) configured to perform data processing on the set of common logical channels based on commands received from the plurality of microcontrollers. The plurality of microcontrollers can be configured to receive uplink grants from a plurality of component carriers, to perform scheduling of the data based on the uplink grants, and to instruct the data processing layer-two circuit to retrieve the data responsive to the uplink grants (as illustrated, for example, in FIG. 7).

The plurality of microcontrollers can be configured to control the data processing layer-two circuit based on a token value, such as token value X, discussed above. The token value can be configured to ensure proportionality among the component carriers, such as using the mechanisms described above.

The data processing layer-two circuit can be configured to set the token value for dequeuing command packet descriptors from a corresponding transmission command queue based on the token value.

The apparatus can also include a medium access control inline buffer (see, for example, MAC inline buffer 280 in FIG. 2) configured to receive packet data from the data processing layer-two circuit based on the command packet descriptors.

The plurality of microcontrollers can be configured to pass commands to the data processing layer-two circuit based on the token value using a plurality of transmission data command queues (see, for example, UL L2 TxData CmdQ in FIG. 2). The plurality of transmission data command queues can be equal in number to the plurality of component carriers. There can also be a corresponding number of status queues (for example, UL L2 StatusQ in FIG. 2).

The data processing layer-two circuit can be configured to prioritize amongst the plurality of transmission data command queues based on at least one parameter of corresponding component carriers. For example, the prioritization can be based on slot duration or timing advance, or first on slot duration and then on timing advance in the case that two component carriers have the same slot duration.

The plurality of layer-two microcontrollers can be configured to perform the logical channel prioritization on a per-component-carrier basis responsive to the uplink grants.

The plurality of microcontrollers can be configured to calculate the token value as a first token value for a first number of packets, where the first number of packets can be those to be transmitted in a current slot. The plurality of microcontrollers can also be configured to calculate the token value as a second token value for a second number of packets, where the second number of packets can be those to be transmitted in a slot immediately following the current slot.

The plurality of microcontrollers can further be configured to identify the token value as a third token value for a third number of packets, where the third number of packets can be the packets from a saved transmission packet list from a slot prior to the current slot. The third token value is retrieved as a stored value from a calculation performed in a slot before the current slot.

The plurality of microcontrollers can be configured to calculate the token value as a fourth token value for a fourth number of packets. The fourth number of packets can include packets to be transmitted more than one slot after the current slot.

The data processing layer-two circuit can be configured to save the fourth token value together with a transmission packet list of the packets to be transmitted more than one slot after the current slot.

The apparatus can also include other features, like an external layer-three memory (L3 external DDR memory in FIG. 2, for example) and a physical layer, such as PHY layer 270 in FIG. 2. Other components and features are also permitted.

Figure 8:
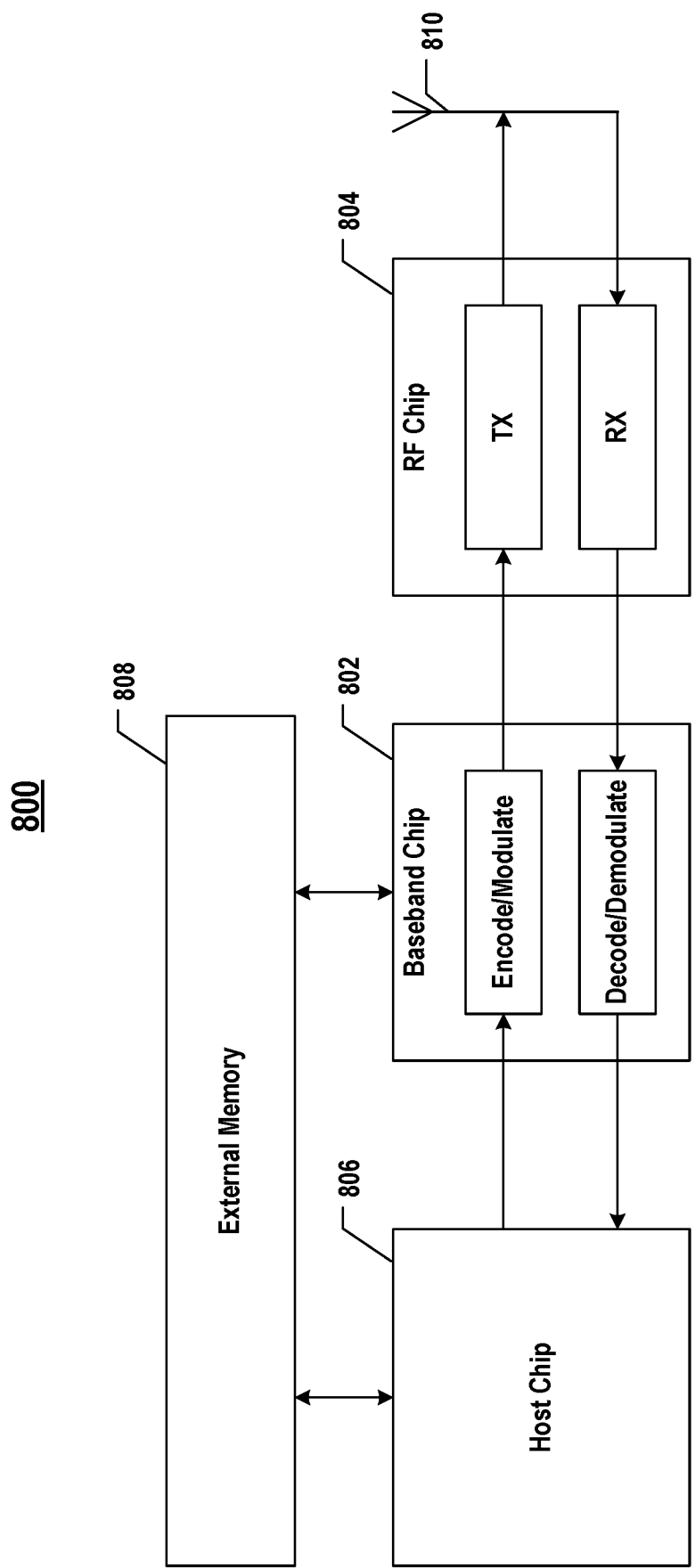
FIG. 8 illustrates a block diagram of an apparatus including a baseband chip, a radio frequency chip, and a host chip, according to some embodiments of the present disclosure.

FIG. 8 illustrates a block diagram of an apparatus 800 including a baseband chip 802, a radio frequency chip 804, and a host chip 806, according to some embodiments of the present disclosure. Apparatus 800 may be an example of any suitable node of wireless network 1000 in FIG. 10, such as user equipment 1002 or network node 1004. As shown in FIG. 8, apparatus 800 may include baseband chip 802, radio frequency chip 804, host chip 806, and one or more antennas 810. In some embodiments, baseband chip 802 is implemented by processor 902 and memory 904, and radio frequency chip 804 is implemented by processor 902, memory 904, and transceiver 906, as described below with respect to FIG. 9. In some embodiments, baseband chip 802 may, in whole or in part, implement the systems and methods and generate and process the messages shown in FIGS. 2-7. For example, baseband chip 802 in a user equipment may perform the UE steps, generate the UE messages, and the like, respectively, in the uplink and downlink. Besides the on-chip memory (also known as "internal memory" or "local memory," e.g., registers, buffers, or caches) on each chip 802, 804, or 806, apparatus 800 may further include an external memory 808 (e.g., the system memory or main memory) that can be shared by each chip 802, 804, or 806 through the system/main bus. Although baseband chip 802 is illustrated as a standalone SoC in FIG. 8, it is understood that in one example, baseband chip 802 and radio frequency chip 804 may be integrated as one SoC; in another example, baseband chip 802 and host chip 806 may be integrated as one SoC; in still another example, baseband chip 802, radio frequency chip 804, and host chip 806 may be integrated as one SoC, as described above.

In the uplink, host chip 806 may generate raw data and send it to baseband chip 802 for encoding, modulation, and mapping. As mentioned above, the data from host chip 806 may be associated with various Internet protocol (IP) flows. Baseband chip 802 may map those IP flows to quality of service flows and perform additional data plane management functions. Baseband chip 802 may also access the raw data generated by host chip 806 and stored in external memory 808, for example, using the direct memory access (DMA). Baseband chip 802 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 802 may perform any other functions, such as symbol or layer mapping, to convert the raw data into a signal that can be used to modulate the carrier frequency for transmission. In the uplink, baseband chip 802 may send the modulated signal to radio frequency chip 804. Radio frequency chip 804, through the transmitter (Tx), may convert the modulated signal in the digital form into analog signals, i.e., radio frequency signals, and perform any suitable front-end radio frequency functions, such as filtering, up-conversion, or sample-rate conversion. Antenna 810 (e.g., an antenna array) may transmit the radio frequency signals provided by the transmitter of radio frequency chip 804.

In the downlink, antenna 810 may receive radio frequency signals and pass the radio frequency signals to the receiver (Rx) of radio frequency chip 804. Radio frequency chip 804 may perform any suitable front-end radio frequency functions, such as filtering, down-conversion, or sample-rate conversion, and convert the radio frequency signals into low-frequency digital signals (baseband signals) that can be processed by baseband chip 802. In the downlink, baseband chip 802 may demodulate and decode the baseband signals to extract raw data that can be processed by host chip 806. Baseband chip 802 may perform additional functions, such as error checking, de-mapping, channel estimation, descrambling, etc. The raw data provided by baseband chip 802 may be sent to host chip 806 directly or stored in external memory 808.

Figure 9:
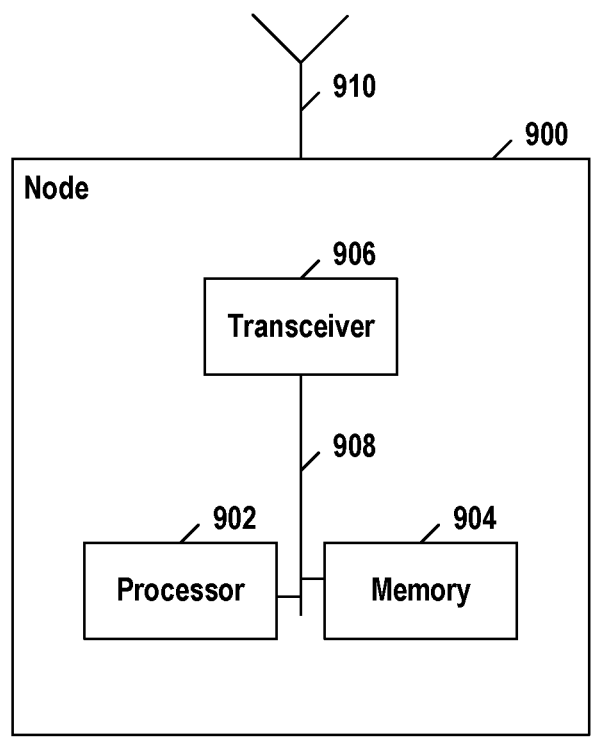
FIG. 9 illustrates an example node, in which some aspects of the present disclosure may be implemented, according to some embodiments of the present disclosure.

As shown in FIG. 9, a node 900 may include a processor 902, a memory 904, a transceiver 906. These components are shown as connected to one another by bus 908, but other connection types are also permitted. When node 900 is user equipment 1002, additional components may also be included, such as a user interface (UI), sensors, and the like. Similarly, node 900 may be implemented as a blade in a server system when node 900 is configured as core network element 1006. Other implementations are also possible.

Transceiver 906 may include any suitable device for sending and/or receiving data. Node 900 may include one or more transceivers, although only one transceiver 906 is shown for simplicity of illustration. An antenna 910 is shown as a possible communication mechanism for node 900. Multiple antennas and/or arrays of antennas may be utilized. Additionally, examples of node 900 may communicate using wired techniques rather than (or in addition to) wireless techniques. For example, network node 1004 may communicate wirelessly to user equipment 1002 and may communicate by a wired connection (for example, by optical or coaxial cable) to core network element 1006. Other communication hardware, such as a network interface card (NIC), may be included as well.

As shown in FIG. 9, node 900 may include processor 902. Although only one processor is shown, it is understood that multiple processors can be included. Processor 902 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 902 may be a hardware device having one or many processing cores. Processor 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Processor 902 may be a baseband chip, such as baseband chip 802 in FIG. 8. Node 900 may also include other processors, not shown, such as a central processing unit of the device, a graphics processor, or the like. Processor 902 may include internal memory (also known as local memory, not shown in FIG. 9) that may serve as memory for L2 data. Processor 902 may include a radio frequency chip, for example, integrated into a baseband chip, or a radio frequency chip may be provided separately. Processor 902 may be configured to operate as a modem of node 900, or may be one element or component of a modem. Other arrangements and configurations are also permitted.

As shown in FIG. 9, node 900 may also include memory 904. Although only one memory is shown, it is understood that multiple memories can be included. Memory 904 can broadly include both memory and storage. For example, memory 904 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 902. Broadly, memory 904 may be embodied by any computer-readable medium, such as a non-transitory computer-readable medium. The memory 904 can be the external memory 808 in FIG. 8. The memory 904 may be shared by processor 902 and other components of node 900, such as the unillustrated graphic processor or central processing unit.

Figure 10:
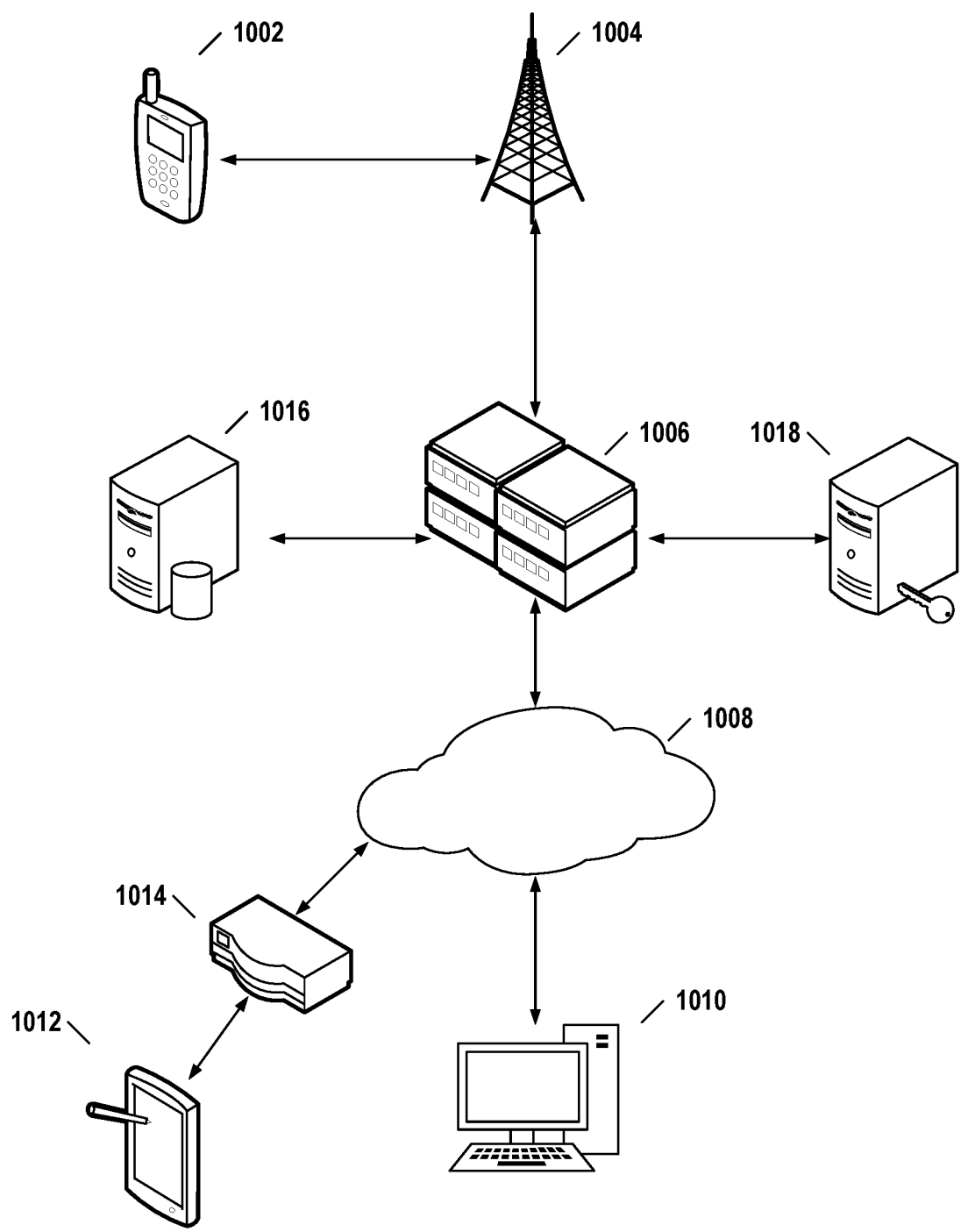
FIG. 10 illustrates an example wireless network, in which some aspects of the present disclosure may be implemented, according to some embodiments of the present disclosure.

As shown in FIG. 10, wireless network 1000 may include a network of nodes, such as a UE 1002, a network node 1004, and a core network element 1006. User equipment 1002 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 1002 is illustrated as a mobile phone simply by way of illustration and not by way of limitation.

Network node 1004 may be a device that communicates with user equipment 1002, such as a wireless access point, a base station (BS), a Node B, an enhanced Node B (eNodeB or eNB), a next-generation NodeB (gNodeB or gNB), a cluster master node, or the like. Network node 1004 may have a wired connection to user equipment 1002, a wireless connection to user equipment 1002, or any combination thereof. Network node 1004 may be connected to user equipment 1002 by multiple connections, and user equipment 1002 may be connected to other access nodes in addition to network node 1004. Network node 1004 may also be connected to other UEs. It is understood that network node 1004 is illustrated by a radio tower by way of illustration and not by way of limitation.

Core network element 1006 may serve network node 1004 and user equipment 1002 to provide core network services. Examples of core network element 1006 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 1006 includes an access and mobility management function (AMF) device, a session management function (SMF) device, or a user plane function (UPF) device, of a core network for the NR system. It is understood that core network element 1006 is shown as a set of rack-mounted servers by way of illustration and not by way of limitation.

Core network element 1006 may connect with a large network, such as the Internet 1008, or another IP network, to communicate packet data over any distance. In this way, data from user equipment 1002 may be communicated to other UEs connected to other access points, including, for example, a computer 1010 connected to Internet 1008, for example, using a wired connection or a wireless connection, or to a tablet 1012 wirelessly connected to Internet 1008 via a router 1014. Thus, computer 1010 and tablet 1012 provide additional examples of possible UEs, and router 1014 provides an example of another possible access node.

A generic example of a rack-mounted server is provided as an illustration of core network element 1006. However, there may be multiple elements in the core network including database servers, such as a database 1016, and security and authentication servers, such as an authentication server 1018. Database 1016 may, for example, manage data related to user subscription to network services. A home location register (HLR) is an example of a standardized database of subscriber information for a cellular network. Likewise, authentication server 1018 may handle authentication of users, sessions, and so on. In the NR system, an authentication server function (AUSF) device may be the specific entity to perform user equipment authentication. In some embodiments, a single server rack may handle multiple such functions, such that the connections between core network element 1006, authentication server 1018, and database 1016, may be local connections within a single rack.

Each of the elements of FIG. 10 may be considered a node of wireless network 1000. More detail regarding the possible implementation of a node is provided by way of example in the description of a node 900 in FIG. 9 above. Node 900 may be configured as user equipment 1002, network node 1004, or core network element 1006 in FIG. 10. Similarly, node 900 may also be configured as computer 1010, router 1014, tablet 1012, database 1016, or authentication server 1018 in FIG. 10.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 900 in FIG. 9. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital versatile disk (DVD), and floppy disk where disks usually reproduce data magnetically, while discs reproduce data optically with lasers. Combinations of the above should also be included within the scope of computer-readable media.

According to one aspect of the present disclosure, an apparatus for data packet processing can include a plurality of microcontrollers configured to perform dedicated layer-two circuit control functions. The plurality of microcontrollers can be configured to concurrently retrieve data from a set of common logical channels. The dedicated layer-two circuit control functions can include logical channel prioritization. The apparatus can also include a data processing layer-two circuit configured to perform data processing on the set of common logical channels based on commands received from the plurality of microcontrollers. The plurality of microcontrollers can be configured to receive uplink grants from a plurality of component carriers, to perform scheduling of the data based on the uplink grants, and to instruct the data processing layer-two circuit to retrieve the data responsive to the uplink grants.

In some embodiments, the plurality of microcontrollers can be configured to control the data processing layer-two circuit based on a token value. The token value can be configured to ensure proportionality among the component carriers.

In some embodiments, the data processing layer-two circuit can be configured to set the token value for dequeuing command packet descriptors from a corresponding transmission command queue based on the token value.

In some embodiments, the apparatus can further include a medium access control inline buffer configured to receive packet data from the data processing layer-two circuit based on the command packet descriptors.

In some embodiments, the plurality of microcontrollers can be configured to pass commands to the data processing layer-two circuit based on the token value using a plurality of transmission data command queues. The plurality of transmission data command queues can be equal in number to the plurality of component carriers.

In some embodiments, the data processing layer-two circuit can be configured to prioritize amongst the plurality of transmission data command queues based on at least one parameter of corresponding component carriers.

In some embodiments, the at least one parameter can include at least one of slot duration or timing advance.

In some embodiments, the plurality of layer-two microcontrollers can be configured to perform the logical channel prioritization on a per-component-carrier basis responsive to the uplink grants.

In some embodiments, the plurality of microcontrollers can be configured to calculate the token value as a first token value for a first number of packets. The first number of packets can be those to be transmitted in a current slot. The plurality of microcontrollers can be configured to calculate the token value as a second token value for a second number of packets. The second number of packets can be those to be transmitted in a slot immediately following the current slot.

In some embodiments, the plurality of microcontrollers can be configured to identify the token value as a third token value for a third number of packets. The third number of packets can be packets from a saved transmission packet list from a slot prior to the current slot.

In some embodiments, the third token value can be retrieved as a stored value from a calculation performed in a slot before the current slot.

In some embodiments, the plurality of microcontrollers can be configured to calculate the token value as a fourth token value for a fourth number of packets. The fourth number of packets can be packets to be transmitted more than one slot after the current slot.

In some embodiments, the data processing layer-two circuit can be configured to save the fourth token value together with a transmission packet list of the packets to be transmitted more than one slot after the current slot.

According to another aspect of the present disclosure, a method for data packet processing can include receiving uplink grants from a plurality of component carriers. The method can also include scheduling, by a plurality of microcontrollers, data based on the uplink grants. The method can further include concurrently retrieving, by the plurality of microcontrollers, the data from a set of common logical channels. The microcontrollers can be configured to perform logical channel prioritization for the data. The concurrently retrieving can include instructing data processing layer-two circuit to retrieve the data responsive to the uplink grants. The data processing layer-two circuit can be configured to perform data processing on the set of common logical channels based on commands received from the plurality of microcontrollers.

In some embodiments, the method can also include controlling, by the plurality of microcontrollers, the data processing layer-two circuit based on a token value. The token value can be configured to ensure proportionality among the component carriers.

In some embodiments, the method can further include setting, by the data processing layer-two circuit, the token value for dequeuing command packet descriptors from a corresponding transmission command queue based on the token value.

In some embodiments, the plurality of component carriers may have a corresponding plurality of transmission data command queues. The method can further include prioritizing, by the data processing layer-two circuit, amongst the plurality of transmission data command queues based on at least one of a slot duration or a timing advance of corresponding component carriers.

In some embodiments, the method can also include calculating, by the plurality of microcontrollers, the token value as a first token value for a first number of packets. The first number of packets can be for transmission in a current slot. The method can further include calculating, by the plurality of microcontrollers, the token value as a second token value for a second number of packets. The second number of packets can be for transmission in a slot immediately following the current slot.

In some embodiments, the method can also include identifying, by the plurality of microcontrollers, the token value as a third token value for a third number of packets. The third number of packets can be packets from a saved transmission packet list from a slot prior to the current slot.

In some embodiments, the method can further include calculating, by the plurality of microcontrollers, the token value as a fourth token value for a fourth number of packets. The fourth number of packets can be packets to be transmitted more than one slot after the current slot.

According to a further aspect of the present disclosure, a method for data packet processing can include receiving uplink grants from a plurality of component carriers. The method can also include prioritizing amongst a plurality of transmission data command queues based on a dynamic transmission component carrier priority list. The plurality of transmission data command queues can be equal in number to the plurality of component carriers. The method can further include retrieving data from a set of common logical channels responsive to the uplink grants. The retrieving can be based on a token value. The token value can be configured to ensure proportionality among the component carriers. The retrieving can be performed using a plurality of transmission data command queues.

In some embodiments, the method can include setting the token value for dequeuing command packet descriptors from a corresponding transmission command queue of the plurality of transmission data command queues based on the token value.

In some embodiments, the method can also include calculating the token value as a first token value for a first number of packets. The first number of packets can be packets to be transmitted in a current slot. The method can further include calculating the token value as a second token value for a second number of packets. The second number of packets can be packets to be transmitted in a slot immediately following the current slot.

In some embodiments, the method can also include identifying the token value as a third token value for a third number of packets. The third number of packets can be packets from a saved transmission packet list from a slot prior to the current slot.

In some embodiments, the method can additionally include calculating, by the plurality of microcontrollers, the token value as a fourth token value for a fourth number of packets. The fourth number of packets can be packets to be transmitted more than one slot after the current slot.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for data packet processing, the apparatus comprising:
a plurality of microcontrollers configured to perform dedicated layer-two circuit control functions, wherein the plurality of microcontrollers are configured to concurrently retrieve data from a set of common logical channels, wherein the dedicated layer-two circuit control functions comprise logical channel prioritization; and
a data processing layer-two circuit configured to perform data processing on the set of common logical channels based on commands received from the plurality of microcontrollers,
wherein the plurality of microcontrollers are configured to receive uplink grants from a plurality of component carriers, to perform scheduling of the data based on the uplink grants, and to instruct the data processing layer-two circuit to retrieve the data responsive to the uplink grants,
wherein the plurality of microcontrollers are configured to pass commands to the data processing layer-two circuit based on a token value using a plurality of transmission data command queues, wherein the plurality of transmission data command queues is equal in number to the plurality of component carriers.

2. The apparatus of claim 1, wherein the plurality of microcontrollers are configured to control the data processing layer-two circuit based on the token value, wherein the token value is configured to ensure proportionality among the component carriers.

3. The apparatus of claim 2, wherein the data processing layer-two circuit is configured to set the token value for dequeuing command packet descriptors from a corresponding transmission command queue based on the token value.

4. The apparatus of claim 3, further comprising:
a medium access control inline buffer configured to receive packet data from the data processing layer-two circuit based on the command packet descriptors.

5. The apparatus of claim 1, wherein the data processing layer-two circuit is configured to prioritize amongst the plurality of transmission data command queues based on at least one parameter of corresponding component carriers.

6. The apparatus of claim 5, wherein the at least one parameter comprises at least one of slot duration or timing advance.

7. The apparatus of claim 1, wherein the plurality of microcontrollers are configured to perform the logical channel prioritization on a per-component-carrier basis responsive to the uplink grants.

8. A method for data packet processing, the method comprising:
receiving uplink grants from a plurality of component carriers;
scheduling, by a plurality of microcontrollers, data based on the uplink grants; and
concurrently retrieving, by the plurality of microcontrollers, the data from a set of common logical channels, wherein the microcontrollers are configured to perform logical channel prioritization for the data,
wherein the concurrently retrieving comprises instructing data processing layer-two circuit to retrieve the data responsive to the uplink grants, wherein the data processing layer-two circuit is configured to perform data processing on the set of common logical channels based on commands received from the plurality of microcontrollers,
wherein the plurality of microcontrollers are configured to pass commands to the data processing layer-two circuit based on a token value using a plurality of transmission data command queues, wherein the plurality of transmission data command queues is equal in number to the plurality of component carriers.

9. The method of claim 8, further comprising:
controlling, by the plurality of microcontrollers, the data processing layer-two circuit based on the token value, wherein the token value is configured to ensure proportionality among the component carriers.

10. The method of claim 9, further comprising:
setting, by the data processing layer-two circuit, the token value for dequeuing command packet descriptors from a corresponding transmission command queue based on the token value.

11. The method of claim 8, further comprising:
prioritizing, by the data processing layer-two circuit, amongst the plurality of transmission data command queues based on at least one of a slot duration or a timing advance of corresponding component carriers.

12. The method of claim 9, further comprising:
calculating, by the plurality of microcontrollers, the token value as a first token value for a first number of packets, wherein the first number of packets are to be transmitted in a current slot; and
calculating, by the plurality of microcontrollers, the token value as a second token value for a second number of packets, wherein the second number of packets are to be transmitted in a slot immediately following the current slot.

13. The method of claim 12, further comprising:
identifying, by the plurality of microcontrollers, the token value as a third token value for a third number of packets, wherein the third number of packets comprises packets from a saved transmission packet list from a slot prior to the current slot.

14. The method of claim 13, further comprising:
calculating, by the plurality of microcontrollers, the token value as a fourth token value for a fourth number of packets, wherein the fourth number of packets comprise packets to be transmitted more than one slot after the current slot.

15. A method for data packet processing, the method comprising:
receiving uplink grants from a plurality of component carriers;
prioritizing amongst a plurality of transmission data command queues based on a dynamic transmission component carrier priority list, wherein the plurality of transmission data command queues is equal in number to the plurality of component carriers; and
retrieving data from a set of common logical channels responsive to the uplink grants, wherein the retrieving is based on a token value, wherein the token value is configured to ensure proportionality among the component carriers, wherein the retrieving is performed using a plurality of transmission data command queues.

16. The method of claim 15, the method further comprising:
setting the token value for dequeuing command packet descriptors from a corresponding transmission command queue of the plurality of transmission data command queues based on the token value.

17. The method of claim 15, further comprising:
calculating the token value as a first token value for a first number of packets, wherein the first number of packets are to be transmitted in a current slot; and
calculating the token value as a second token value for a second number of packets, wherein the second number of packets are to be transmitted in a slot immediately following the current slot.

18. The method of claim 17, further comprising:
identifying the token value as a third token value for a third number of packets, wherein the third number of packets comprises packets from a saved transmission packet list from a slot prior to the current slot.

19. The method of claim 18, further comprising:
calculating the token value as a fourth token value for a fourth number of packets, wherein the fourth number of packets comprise packets to be transmitted more than one slot after the current slot.

\* \* \* \* \*